(12) United States Patent
Ogiso et al.

(10) Patent No.: US 7,434,845 B2
(45) Date of Patent: Oct. 14, 2008

(54) QUICK CONNECTOR

(75) Inventors: Jun Ogiso, Komaki (JP); Kazuhiro Kato, Nagoya (JP)

(73) Assignee: Tokai Rubber Industries, Aichi-Ken (JP)

( * ) Notice: Subject to any disclaimer, the term of this patent is extended or adjusted under 35 U.S.C. 154(b) by 36 days.

(21) Appl. No.: 11/085,887

(22) Filed: Mar. 21, 2005

(65) Prior Publication Data

US 2005/0206161 A1 Sep. 22, 2005

(30) Foreign Application Priority Data

Mar. 22, 2004 (JP) .............................. 2004-083726

(51) Int. Cl.
*F16L 39/00* (2006.01)
(52) U.S. Cl. .................. 285/319; 285/148.16; 285/239; 285/259
(58) Field of Classification Search ............ 285/148.16, 285/239, 259, 305, 319, 370, 397, 242
See application file for complete search history.

(56) References Cited

U.S. PATENT DOCUMENTS

| | | | | |
|---|---|---|---|---|
| 3,606,396 A | * | 9/1971 | Prosdocimo et al. ... | 285/148.18 |
| 5,161,833 A | * | 11/1992 | McNaughton et al. ...... | 285/319 |
| 5,452,924 A | * | 9/1995 | Kujawski ..................... | 285/305 |
| 6,129,393 A | | 10/2000 | Kodama et al. | |
| 6,250,692 B1 | | 6/2001 | Ito et al. | |
| 6,279,966 B1 | | 8/2001 | Kondo et al. | |
| 6,293,596 B1 | * | 9/2001 | Kinder ........................ | 285/305 |
| 2002/0084654 A1 | * | 7/2002 | Katayama et al. ........... | 285/423 |
| 2004/0036282 A1 | | 2/2004 | Rohde et al. | |

FOREIGN PATENT DOCUMENTS

| | | |
|---|---|---|
| EP | 0 971 163 A3 | 1/2000 |
| JP | 7-71673 A | 3/1995 |

* cited by examiner

*Primary Examiner*—Aaron M Dunwoody
*Assistant Examiner*—Fannie Kee
(74) *Attorney, Agent, or Firm*—Darby & Darby P.C.

(57) ABSTRACT

A quick connector includes: a connector body having a retainer holding portion, a tube connecting portion to be press fitted into a tube, and a housing between the retainer holding portion and the tube connecting portion, the tube connecting portion being formed with a plurality of annular projections being axially spaced apart from each other; and a retainer which is held in an axially fixed state by the retainer holding portion. A portion of an outer surface of the tube connecting portion extending from the annular projection, which is closest to the housing, toward the housing is formed into a tapered surface whose diameter is gradually enlarged toward the housing, and a diameter of an annular projection side of the tapered surface is set to be larger than a diameter of the outer surface of the tube connecting portion between the annular projections.

8 Claims, 9 Drawing Sheets

QUICK CONNECTOR

BACKGROUND OF THE INVENTION

1. Field of the Invention

The present invention relates to a quick connector which is used when a flexible tube formed of a resin, rubber, or the like is connected to a mating pipe. More specifically, the invention relates to a quick connector for connecting a flexible tube used for transporting fuel to a mating pipe.

2. Description of the Related Art

Conventionally, as a connector for connecting a flexible tube formed of a resin, rubber, or the like to a mating pipe, to transport fuel, for example, to transport fuel in a fuel tank to an engine side, the following quick connector is used. Namely, this quick connector is comprised of (a) a connector body which is formed in a tubular shape as a whole and has on its one axial side a socket-like retainer holding portion for insertion of the mating pipe therein and on its other side a tube connecting portion which is press fitted into a tube; (b) a retainer which is held in an axially fixed state by the retainer holding portion and serves as a detent for the mating pipe by axially engaging an engageable portion of an outer peripheral surface of the mating pipe over which an engaging portion on an inner peripheral side has been fitted; and (c) a seal member which is fitted in the interior of the connector body, i.e., in an innermost part located on the tube connecting portion side away from the retainer holding portion, and serves as a seal by coming into contact with an outer peripheral surface of the inserted mating pipe. Further, a plurality of annular projections serving as detents for the tube by biting into an inner surface of the tube are formed in the tube connecting portion in such a way as to be axially spaced apart from each other.

For example, JP-A-7-71673 discloses a quick connector of this type.

FIG. 8 specifically shows an example thereof.

In FIG. 8, reference numeral 200 denotes a quick connector for connecting a tube shown in FIGS. 9A and 9B to a mating pipe 204, and the quick connector 200 has a connector body 206 (made of a resin in this case).

The connector body 206 is formed in a tubular shape as a whole and has on its one axial side a socket-like retainer holding portion 208 for insertion of the mating pipe 204 therein and on its other side a tube connecting portion 210 which is press fitted into the tube 202 (shown in Figures 9A and 9B), a housing 212 being provided midway there between.

In the connector body 206, an O-ring 214 and a bush 216 are fitted in an innermost part located on the tube connecting portion 210 side away from the retainer holding portion 208, specifically inside the housing 212. The O-ring 214 and the bush 216 are adapted to come into contact with and seal an outer peripheral surface of the inserted mating pipe 204.

A window portion 218 having the shape of an opening is provided in the retainer holding portion 208. A front end portion (on the left end side in the drawing) of a frame portion on an outer peripheral side of the window portion 218 is formed as an engageable portion 220 for engaging a groove-like engaging portion 224 in a retainer 222 which will be described later.

The retainer 222 (made of a resin in this case) is a member which is formed separately from the connector body 206 and is held by the retainer holding portion 208, and the retainer 222 is resiliently deformable in the radial direction.

This retainer 222 engages the engageable portion 220 of the retainer holding portion 208 at the groove-like engaging portion 224 on the outer peripheral side, and is held in an axially fixed state by the retainer holding portion 208 as a result of their engaging action.

The retainer 222 has an engaging portion 226 on the inner peripheral side constituted by an engaging pawl, and this engaging portion 226 is adapted to axially engage an engageable portion 228 constituted by an annular projection on the outer peripheral surface of the mating pipe 204 so as to prevent the mating pipe 204 inserted in the connector body 206 from coming off.

This retainer 222 further has an inner peripheral cam surface 230 and an outer peripheral cam surface 232 which are provided on its inner peripheral surface and outer peripheral surface and which serve as engaging guides.

The inner peripheral cam surface 230 and the outer peripheral cam surface 232 act as follows.

Namely, when the mating pipe 204 is axially inserted with the retainer 222 held by the retainer holding portion 208, the inner peripheral cam surface 230 abuts against the engageable portion 228 of the mating pipe 204 and serves as a guide for the insertion of the engageable portion 228. At the same time, the inner peripheral cam surface 230 resiliently expands the retainer 222 by means of its cam action.

When the engageable portion 228 passes the engaging portion 226, the retainer 222 returns to its state of reduced diameter and causes the engaging portion 226 to axially engage the engageable portion 228 of the mating pipe 204.

At this stage, the mating pipe 204 is prevented from coming off the connector body 206.

At the time of insertion of the mating pipe 204, the retainer 222 can be attached in advance to the mating pipe 204 side. In this case, when the mating pipe 204 is inserted into the connector body 206, the outer peripheral cam surface 232 of the retainer 222 abuts against the engageable portion 220 of the retainer holding portion 208 and resiliently deforms the retainer 222 in the diameter-reducing direction.

When the engaging portion 224 on the outer peripheral side reaches the engageable portion 220 of the retainer holding portion 208, the retainer 222 undergoes expansion in its diameter, and the engaging portion 224 and the engageable portion 220 form an axially engaged state.

The aforementioned tube connecting portion 210 has a small diameter with respect to the housing 212. A wall 234 orthogonally rises radially outwardly from its joint. This wall 234 serves to define a fitting length of the tube 202 by causing a distal end face of the tube 202 to abut against it.

This tube connecting portion 210 is provided with a plurality of annular projections 238-1, 238-2, and 238-3 in such a manner as to be axially spaced apart from each other.

These annular projections 238-1, 238-2, and 238-3 bite into the inner surface of the tube 202 to serve as detents, and their tips are shaped in the form of acute-angled saw teeth in terms of their cross sections.

Portions between these annular projections 238-1, 238-2, and 238-3 of the tube connecting portion 210 are formed as flat surfaces 240-1 and 240-2 which are parallel to the axial direction.

In addition, a portion between the joint of the tube connecting portion 210 and the annular projection 238-3 which is the farthest one and closest to that joint is formed as a flat surface 240-3 which is similarly parallel to the axial direction. In addition, a portion extending more on the distal end side than the most distal end-side annular projection 238-1 is also formed as a flat surface 240-4 which is similarly parallel to the axial direction.

Here, the respective flat surfaces 240-1, 240-2, 240-3, and 242-4 have the same diameter.

The reason the flat surfaces 240-1 and 240-2 are formed between adjacent ones of the annular projections 238-1, 238-2, and 238-3, and the flat surfaces 240-4 and 240-3 similarly of the same diameter are formed in the front end portion and the rear end portion is as follows: When such a tube connecting portion 210 is press fitted into and connected to the tube 202, the tube connecting portion 210 and the tube 202 can be brought satisfactorily into a state of close contact, and hence the coming-off force of the tube 202 can be increased.

Specifically, as for the tube 202 which is fitted over the tube connecting portion 210, its inner surface is deflected in such a manner as to be brought substantially into close contact with the flat surfaces 240-1, 240-2, 240-3, and 240-4, and the depth of the biting of the annular projections 238-1, 238-2, and 238-3 into the inner surface of the tube 202 becomes deep. Hence, the effect of preventing the coming off of the tube 202 is enhanced.

Furthermore, the inner surface of the tube 202 is brought substantially into close contact with the flat surfaces 240-1, 240-2, 240-3, and 240-4, and as the area of contact between the tube connecting portion 210 and the inner surface of the tube 202 increases, the coming-off preventing effect is enhanced.

Incidentally, reference numeral 242 denotes an O-ring groove having a cross-sectionally rectangular shape. As shown in FIGS. 9A and 9B, an O-ring 246 for providing a seal with respect to the tube 202 is adapted to be fitted therein.

As for this quick connector 200, as shown in FIG. 9B by merely pressing fitting the tube connecting portion 210 into the tube 202 and inserting the mating pipe 204 into the connector body 206 from the opposite side as shown in FIG. 8, the tube 202 and the mating pipe 204 can simply be set in a connected state.

As for this quick connector 200, as shown in FIG. 9B, by merely pressing fitting the tube connecting portion 210 into the tube 202 and inserting the mating pipe 204 into the connector body 206 from the opposite side, the tube 202 and the mating pipe 204 can simply be set in a connected state.

With this quick connector 200, there is a problem in that a stress is likely to concentrate in the root portion of the tube connecting portion 210 having a small diameter, and this portion becomes a weak point portion in terms of strength.

The connector body 206 and the tube connecting portion 210 become large or slender depending on the diameter of the tube 202 to be connected. In either case, this problem occurs in common. However, particularly when the diameter of the tube connecting portion 210 becomes small in correspondence with the diameter of the tube 202, a large load acts in that root portion in a concentrated manner. Hence, there is a problem in that in cases such as where a bending force or the like is applied through the tube 202 at the time of connection of the tube 202 or after the connection, there is a possibility of the tube connecting portion 210 being broken at that root portion. Especially, this problem likely occurs in the case where the inner diameter of the tube 202 is 5 mm or less.

Also, when the entire length of the tube connecting portion 210 is long relative to the inner diameter of the tube 202, more specifically, when the value derived by dividing the entire length of the tube connecting portion 210 with the inner diameter of the tube 202 is 5 or more, particularly when the value is 6 or more, the same problem likely occurs.

U.S. Pat. No. 6,129,393 discloses a quick connector in which the cross-sectional shape of the joint of the tube connecting portion 210 is a round shape (circular arc shape).

SUMMARY OF THE INVENTION

However, according to an experiment conducted by the present inventors, it was found that even in the case where the joint is formed in such a round shape, the strength of the root portion cannot be made sufficiently high, and that there still remains the issue that the problem of breakage cannot be overcome.

The present invention has been devised in view of the above-described circumstances, and its object is to provide a quick connector for tube connection which makes it possible to make the strength of the tube connecting portion high and prevents the tube connecting portion from being broken.

In accordance with a first aspect of the invention, there is provided a quick connector for connecting a flexible tube to a mating pipe, including: a connector body which is formed in a tubular shape as a whole, the connector body having on its one axial side a retainer holding portion for insertion of the mating pipe therein, on its other axial side a tube connecting portion to be press fitted into the tube, and a housing between the retainer holding portion and the tube connecting portion, the tube connecting portion being formed with a plurality of annular projections that serve as detents for the tube by biting into an inner surface of the tube, the annular projections being formed in such a way as to be axially spaced apart from each other; a retainer which is held in an axially fixed state by the retainer holding portion and serves as a detent for the mating pipe by axially engaging an engaging portion on an inner peripheral side thereof with an engageable portion of an outer peripheral surface of the mating pipe; and a seal member which is fitted in the connector body and located on a tube connecting portion side away from the retainer holding portion, and serves as a seal by coming into contact with an outer peripheral surface of the inserted mating pipe; wherein a portion of an outer surface of the tube connecting portion extending from the annular projection, which is closest to the housing, toward the housing is formed into a tapered surface whose diameter is gradually enlarged toward the housing, and a diameter of an annular projection side of the tapered surface is set to be larger than a diameter of the outer surface of the tube connecting portion between the annular projections.

According to a second aspect of the invention, a flat surface which is parallel to an axial direction is provided between the annular projections in the tube connecting portion, and the diameter of the annular projection side of the tapered surface is set to be larger than a diameter of the flat surface.

According to a third aspect of the invention, a wall for causing a distal end face of the tube to abut against the wall rises radially outwardly from a jointing point between the tube connecting portion and the housing.

According to a fourth aspect of the invention, a maximum diameter of the tapered surface on a side of a jointing point between the tube connecting portion and the housing is set to be substantially the same as a diameter of the annular projection other than the annular projection that is closest to the housing.

According to a fifth aspect of the invention, a diameter of the annular projection that is closest to the housing is set to be larger than a diameter of the other annular projections.

As described above, in the invention, a portion extending from the annular projection which is farthest, as viewed from the tube, toward the housing is formed as a tapered surface whose diameter is gradually enlarged toward the housing. The diameter of the side of the farthest annular projection which is a small-diameter side of the tapered surface is set to be larger than the diameter of a portion between the annular projections which are located more on the distal end side than the farthest annular projection.

In the quick connector in accordance with the invention, its root portion extending from the farthest in the tube connecting portion to the housing, where the stress is most likely to be concentrated, has large thickness and large diameter. In addition, its thickness and diameter are so shaped as to gradually increase toward the housing. Therefore, the root portion can be provided with high strength. Even in cases such as where a large bending force is applied to the tube connecting portion through the tube or the like during the tube connecting operation or after the tube connection, it is possible to effectively prevent the tube connecting portion from being broken at the root portion.

In the invention, a flat surface which is parallel to the axial direction can be provided between one annular projection and another annular projection in the tube connecting portion, and the diameter of the side of the farthest annular projection which is the small-diameter side in the tapered surface can be set to be larger than the diameter of the flat surface (second aspect).

Thus, since the flat surface which is parallel to the axial direction is provided between one annular projection and another annular projection, the inner surface of the tube fitted over the tube connecting portion can be brought substantially into close contact with that flat surface, thereby making it possible to more effectively prevent the tube from coming off The advantage is particularly large if the invention is applied to a quick connector in which a wall for causing the distal end face of the tube to abut against the wall rises radially outwardly from the joint of the tube connecting portion, and the fitting length of the tube is adapted to be defined by the wall (third aspect).

In the quick connector of this form, a stress concentration caused by a bending force or the like applied through the tube or the like is likely to occur particularly at the root portion of the tube connecting portion. By applying the invention to the quick connector of such a form, it becomes possible to effectively prevent the breakage of the tube connecting portion at the root portion.

In the invention, a maximum diameter of the tapered surface on the side of the joint of the tube connecting portion can be set to be substantially the same as the diameter of the annular projection located more on the distal end side of the tube connecting portion than the farthest annular projection (fourth aspect).

If the maximum diameter of the tapered surface becomes larger than the diameter of the annular projection located more on its distal end side, the amount of the biting of the annular projection on the distal end side into the tube declines, and the coming-off preventing effect based on it declines. Therefore, according to the fourth aspect of the invention, such defects can be obviated.

In the invention, the diameter of the farthest annular projection can be set to be larger than the diameter of the annular projection located more on the distal end side than the farthest annular projection (fifth aspect).

Thus, since the diameter of the farthest annular projection is made large, even in the case where the diameter of the root portion extending from the farthest annular projection to the joint of the tube connecting portion is made large, it is possible to maintain the amount of the biting of the farthest annular projection into the inner surface of the tube at a high level and maintain the effect of preventing the coming off of the tube as a result of it to a high level.

DETAILED DESCRIPTION OF THE PREFFERED EMBODIMENT

Figure 1:
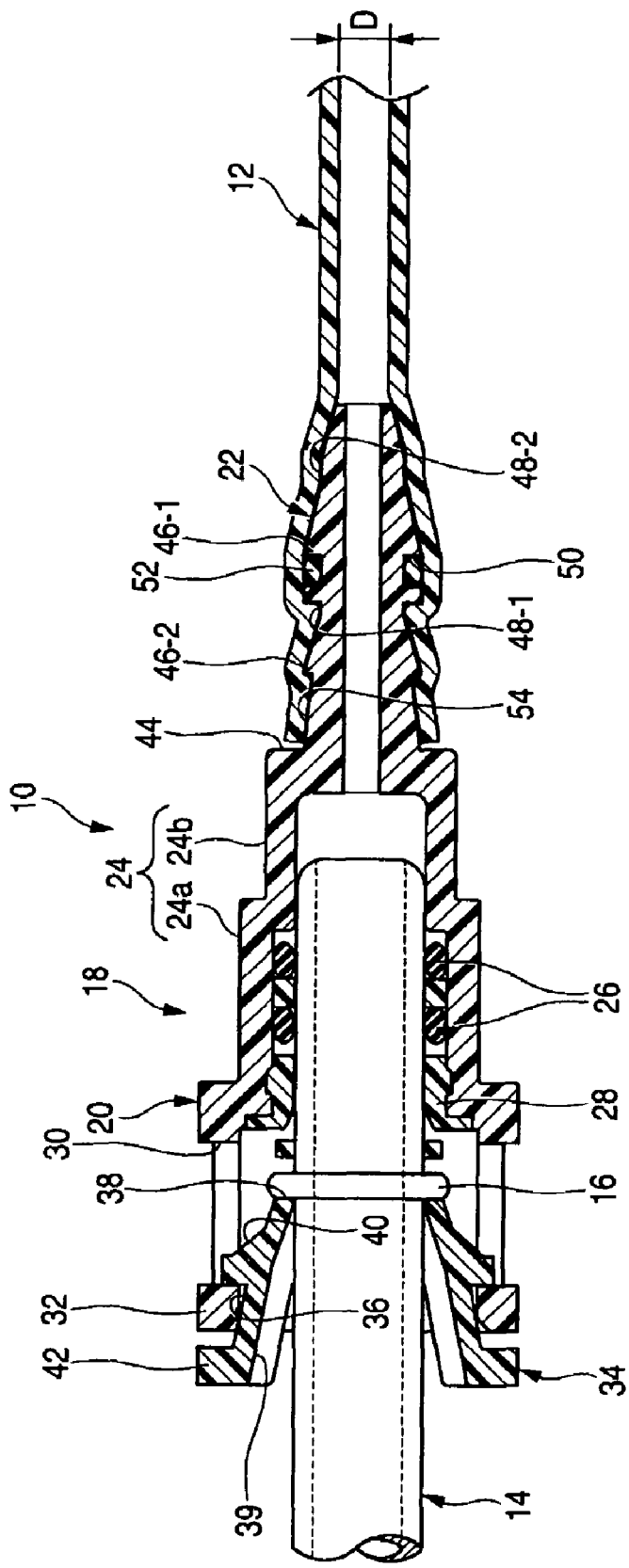
FIG. 1 is a cross-sectional view of a quick connector in accordance with an embodiment of the invention and illustrates a state of connection of a tube shown in cross section and a mating pipe shown in solid line.

Now, referring to the drawings, a detailed description will be given of an embodiment of the invention.

Figure 2:
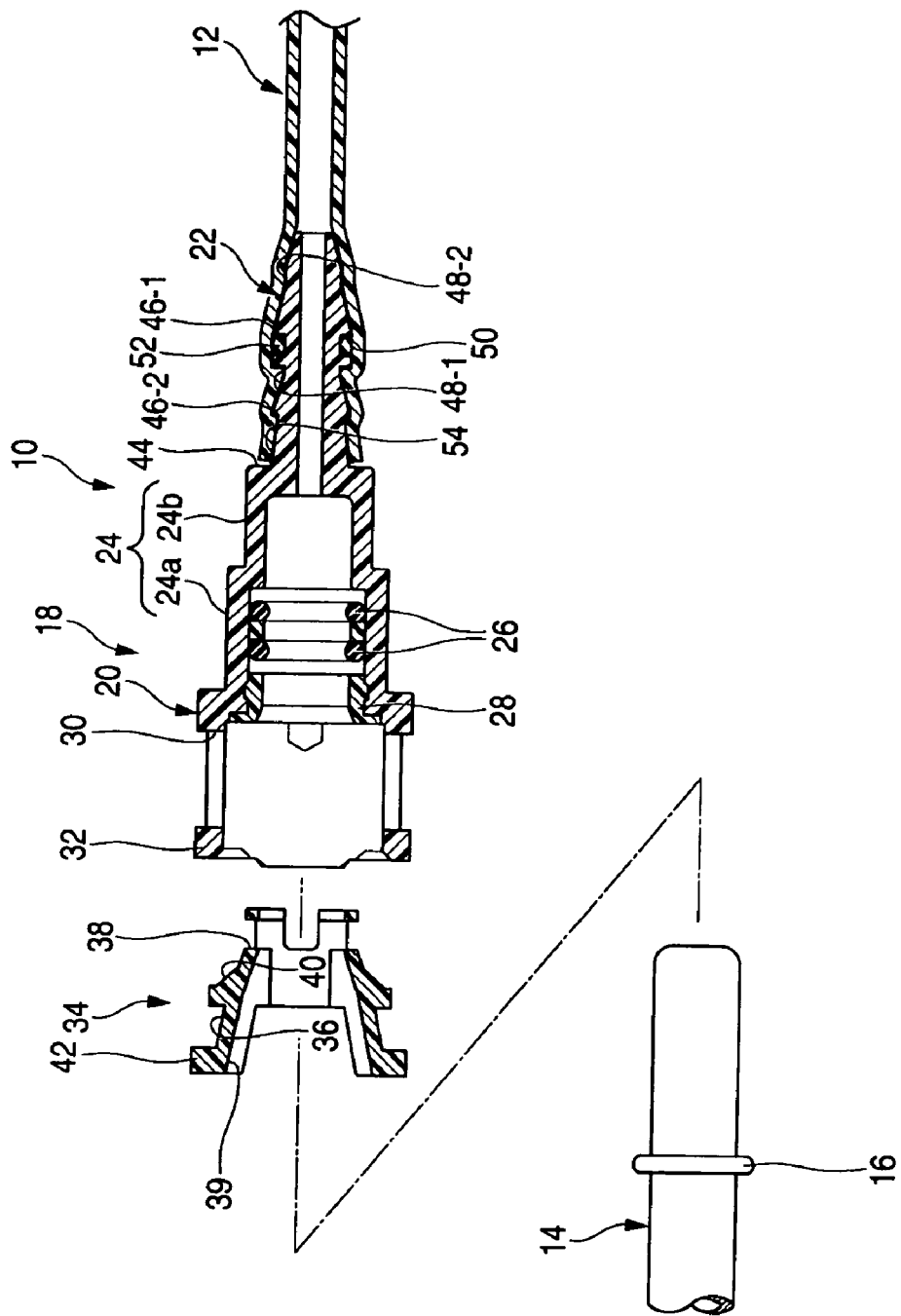
FIG. 2 is a diagram illustrating the quick connector of the embodiment together with the tube and the mating pipe in a state in which the quick connector is disassembled into a connector body and a retainer.
Figure 3:
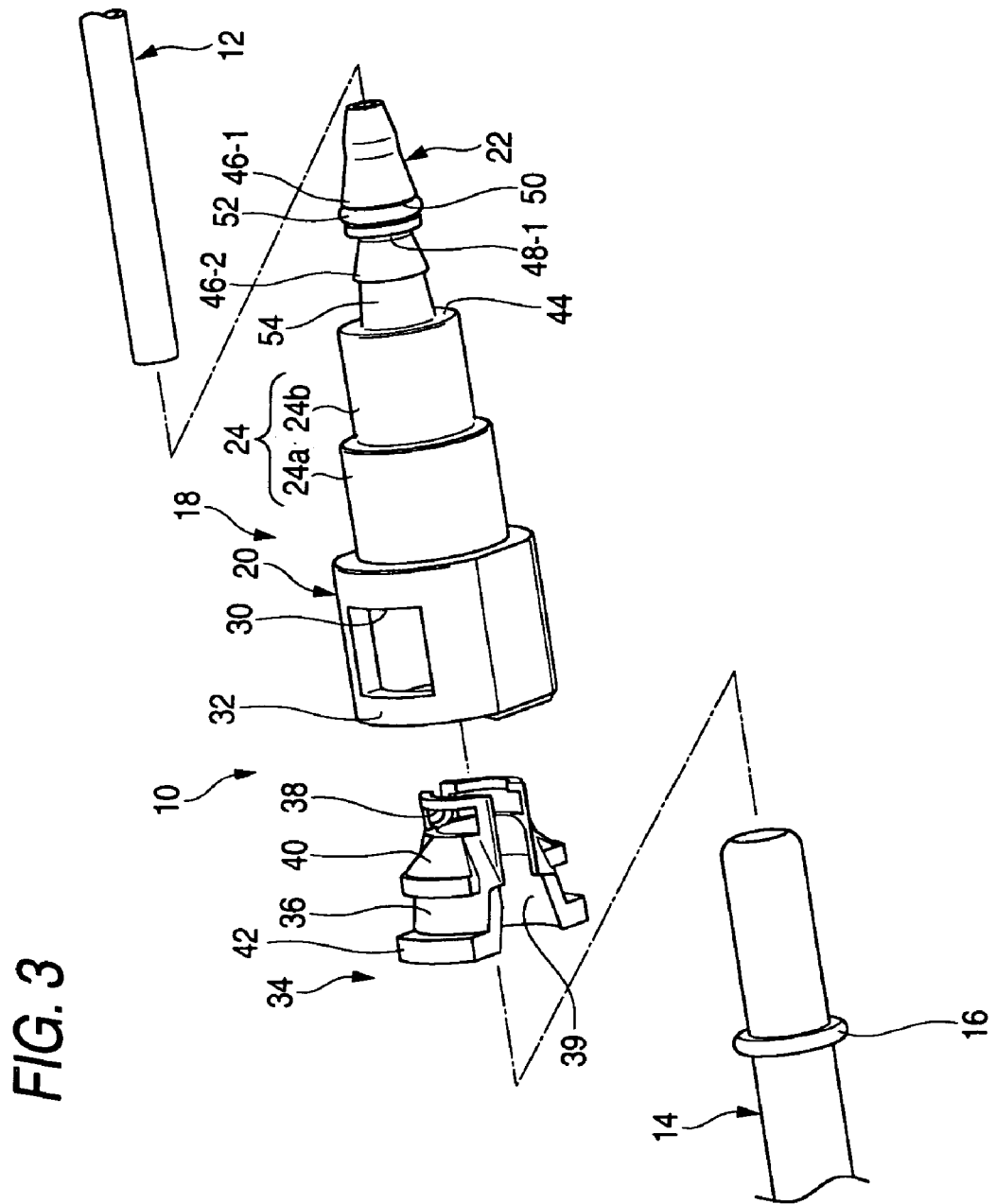
FIG. 3 is a perspective view illustrating the quick connector of the embodiment together with the tube and the mating pipe in a state in which the quick connector is disassembled into the connector body and the retainer.

In FIGS. 1 to 3, reference numeral 10 denotes a quick connector for connecting a flexible tube (made of a resin in this example) 12 that is used for transporting fuel in, for example, small vehicles such as light cars and motorcycles to a mating pipe 14 made of a metal.

Here, an engageable portion 16 constituted by an annular projection is provided on an outer peripheral surface of the mating pipe 14 at a position located in the vicinity of a distal end thereof.

Incidentally, the "small vehicles" include motorcycles and ATVs (All Terrain Vehicles ) in the meaning thereof The quick connector 10 has a connector body 18 (made of a resin in this example).

The connector body 18 is formed in a tubular shape as a whole and has on its one axial side a socket-like retainer holding portion 20 for insertion of the mating pipe 14 therein and on its other side a tube connecting portion 22 which is press fitted into the tube 12, a housing 24 being provided midway there between. The housing 24 includes a seal holding portion 24*a* the diameter of which is smaller than that of the retainer holding portion 20, and a joint portion 24*b* at the tube connecting portion 22 side, the diameter of which is still smaller than that of the seal holding portion 24*a*.

In the connector body 18, an O-ring 26 and a bush 28 are fitted in an innermost part located on the tube connecting portion 22 side away from the retainer holding portion 20, specifically in the housing 24. The O-ring 26 and the bush 28 are adapted to come into contact with and seal an outer peripheral surface of the inserted mating pipe 14.

A window portion 30 having the shape of an opening is provided in the retainer holding portion 20. A front end portion (on the left end side in the drawing) of a frame portion on an outer peripheral side of the window portion 30 is formed as an engageable portion 32 for engaging a groove-like engaging portion 36 in a retainer 34 which will be described later.

This retainer 34 engages the engageable portion 32 of the retainer holding portion 20 at the groove-like engaging portion 36 on the outer peripheral side, and is held in an axially fixed state by the retainer holding portion 20 as a result of their engaging action.

The retainer 34 has an opening-shaped engaging portion (an engaging portion on the inner peripheral side) 38 provided on its inner peripheral side. As the engageable portion 16, constituted by the annular projection, of the mating pipe 14 is fitted into that engaging portion 38, the engaging portion 38 is axially engaged with the engageable portion 16 so as to prevent the mating pipe 14 from coming off.

This retainer 34 further has an inner peripheral cam surface 39 and an outer peripheral cam surface 40 which are provided on its inner peripheral surface and outer peripheral surface and which serve as engaging guides.

The inner peripheral cam surface 39 and the outer peripheral cam surface 40 respectively act as follows.

Namely, if the mating pipe 14 is axially inserted with the retainer 34 held by the retainer holding portion 20, the inner peripheral cam surface 39 abuts against the engageable portion 16 of the mating pipe 14 and serves as its insertion guide. At the same time, the inner peripheral cam surface 39 resiliently expands the retainer 34 by means of its cam action.

When the engageable portion 16 passes the opening-shaped engaging portion 38, the retainer 34 returns from its resiliently expanded state to its state of reduced diameter, so that the engaging portion 38 of the retainer 34 and the engageable portion 16 of the mating pipe 14 are set in an axially engaged state.

At this stage, the mating pipe 14 is prevented from coming off the connector body 18.

At the time of insertion of the mating pipe 14, the retainer 34 can be attached in advance to the mating pipe 14 side. In this case, when the mating pipe 14 is inserted into the connector body 18, the outer peripheral cam surface 40 of the retainer 34 serves as an insertion guide by abutting against the engageable portion 32 of the retainer holding portion 20, and resiliently deforms the retainer 34 in the diameter-reducing direction.

When the engaging portion 36 on the outer peripheral side reaches the engageable portion 32 of the retainer holding portion 20, the retainer 34 returns to the state of enlarged diameter from the state of reduced diameter, and the engaging portion 36 and the engageable portion 32 assume an axially engaged state.

Incidentally, the retainer 34 has an operation knob 42 provided at its distal end portion (left end portion in the drawing) for performing the deforming operation of the retainer 34 in the diameter-reducing direction.

Incidentally, the retainer 34 in this example is a resin-made member and is formed as a radially resiliently deformable one having the shape of a C-ring as a whole, as shown in FIG. 3, and is arranged to engage the connector body 18 in the axial direction. However, the retainer 34 may be such a retainer that a window portion allowing the retainer to be movable in a direction orthogonal to the axial direction is formed in the connector body 18, and the retainer is slid from the direction orthogonal to the axial direction so as to engage the engageable portion 16, constituted by the annular projection, of the mating pipe 14.

If such a retainer which is movable in the direction orthogonal to the axial direction is used, it is possible to use one which is formed into the shape of a ring or a staple by bending or forming a wire or resin having a circular or rectangular cross section. If such a retainer is adopted, it is advantageous in terms of cost.

Figure 4:
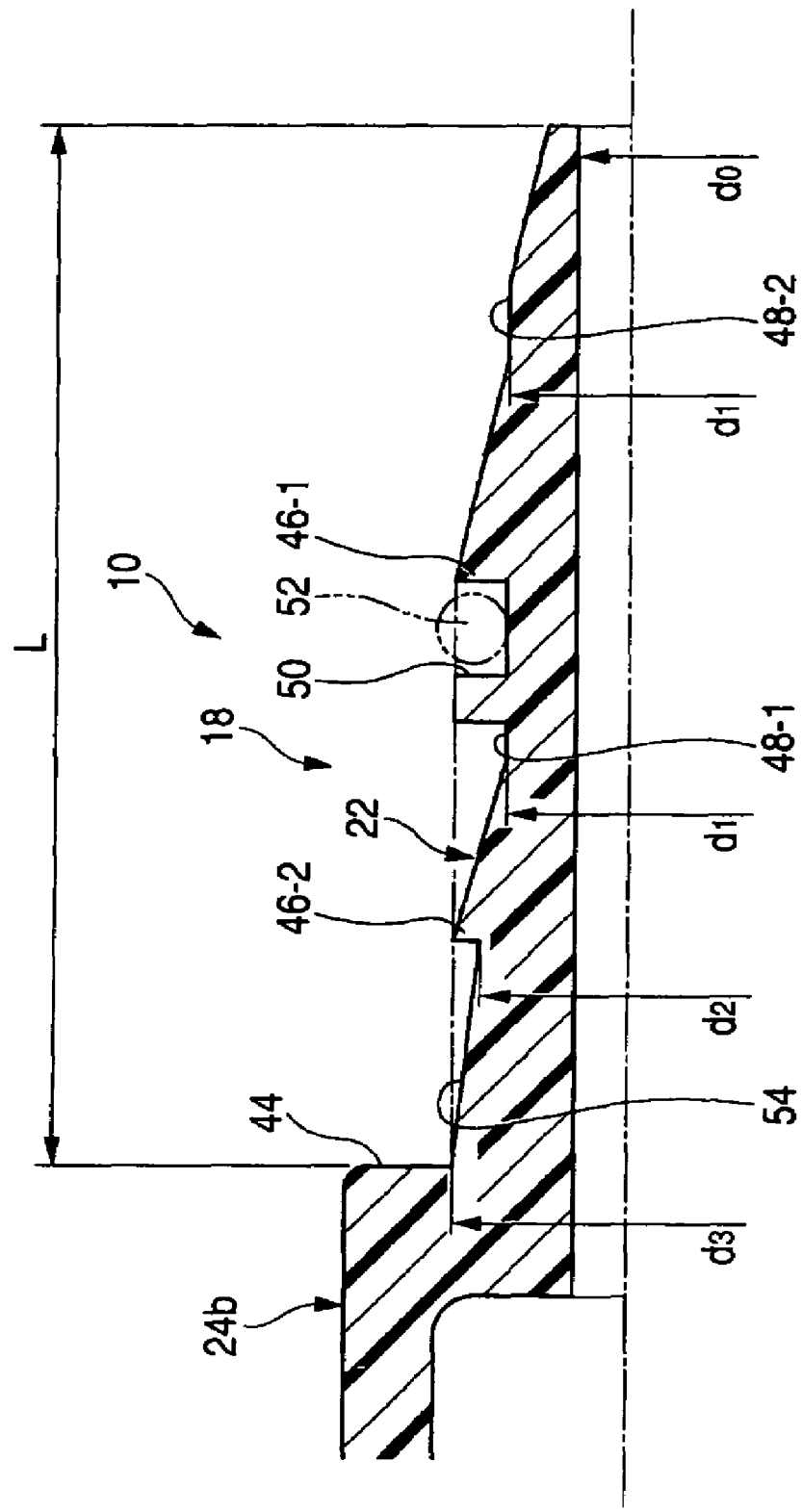
FIG. 4 is an enlarged cross-sectional view of essential portions of the embodiment.

The aforementioned tube connecting portion 22 has a small diameter with respect to the housing 24, as shown in detail in FIG. 4. A wall 44 orthogonally rises radially outwardly from its jointing point to the joint portion 24b. This wall 44 serves to define a fitting length of the tube 12 by allowing a distal end face to abut against it.

In this embodiment, the tube connecting portion 22 is provided with two annular projections 46-1 and 46-2 in such a manner as to be axially spaced apart from each other. Incidentally, "L" denotes the entire length of the tube connecting portion 22, and "d0" denotes the inner diameter of the tube connecting portion 22.

These annular projections 46-1 and 46-2 bite into the inner surface of the tube 12 to serve as detents, and their tips are shaped in the form of acute-angled saw teeth in terms of their cross sections.

A flat surface 48-1 which is parallel to the axial direction is formed between these annular projections 46-1 and 46-2. Also, a flat surface 48-2 which is similarly parallel to the axial direction is formed on a portion extending more on the distal end side than the annular projection 46-1.

Here, the flat surfaces 48-1 and 48-2 have the same diameter d1.

Incidentally, an O-ring groove 50 having a cross-sectionally rectangular shape is provided between the annular projections 46-1 and 46-2, and an O-ring 52 for sealing is fitted therein.

In this embodiment, the portion extending from the annular projection 46-2, i.e., the farthest annular projection 46-2 as viewed from the tube 12, to the jointing point of the tube connecting portion 22 is formed as a tapered surface 54 whose diameter is gradually enlarged toward the joint.

In addition, as for this tapered surface 54, the diameter d2 of its annular projection 46-2 side which is the small-diameter side is set to be larger than the diameter d1 of the flat surfaces 48-1 and 48-2.

On the other hand, the diameter d3 of the large-diameter side of the tapered surface 54, i.e., the diameter d3 of the jointing point side of the tube connecting portion 22, is set to be substantially the same as the diameter of the annular projections 46-1 and 46-2.

As for the quick connector 10 of this embodiment, as shown in FIGS. 1 and 2, by merely pressing fitting the tube connecting portion 22 into the tube 12 and inserting the mating pipe 14 into the connector body 18 from the retainer holding portion 20 side, the tube 12 and the mating pipe 14 can simply be set in a connected state.

At this time, the annular projections 46-1 and 46-2 in the tube connecting portion 22 are in the state of biting into the inner surface of the tube 12, thereby satisfactorily preventing the tube 12 from coming off.

In addition, in this connected state, the inner surface of the tube 12 is substantially in a state of close contact with the flat surfaces 48-1 and 48-2 and the tapered surface 54 in the tube connecting portion 22, so that the prevention of coming off by the annular projections 46-1 and 46-2 functions effectively.

According to the above-described quick connector 10 of this embodiment, a root portion of the tube connecting portion 22 extending from the farthest annular projection 46-2 to the jointing point, where the stress is most likely to be concentrated, has large thickness and large diameter. In addition, its thickness and diameter are so shaped as to gradually increase toward the jointing point. Therefore, the root portion can be provided with high strength. Even in a case where a large bending force or the like is applied to the tube connecting portion 22 through the tube 12 during the connecting operation of the tube 12 or after the connection, it is possible to effectively prevent the tube connecting portion 22 from being broken at the root portion.

In addition, since the flat surface 48-1 which is parallel to the axial direction is provided between the annular projection 46-1 and the annular projection 46-2, the inner surface of the tube 12 fitted over the tube connecting portion 22 can be brought substantially into close contact with that flat surface 48-1, thereby making it possible to more effectively prevent the tube 12 from coming off.

Figure 5A:
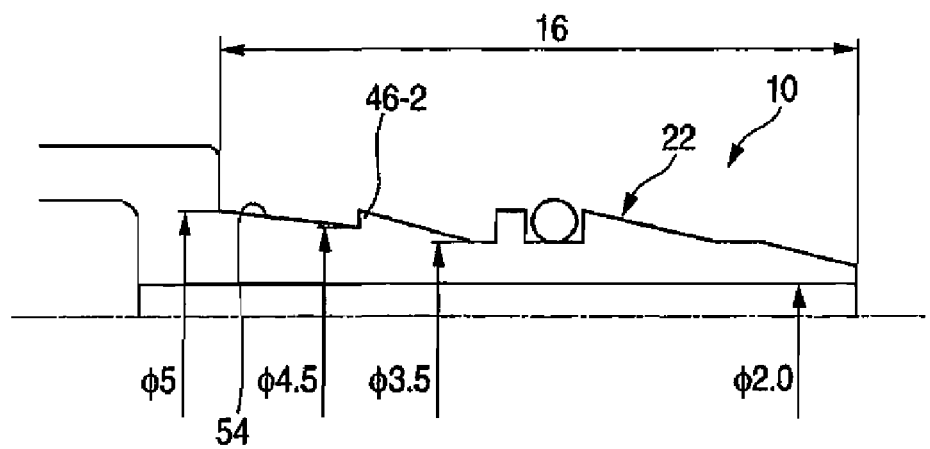
FIGS. 5A and 5B are diagrams illustrating the quick connector of the embodiment and the quick connector of a comparative example which are used in the measurement of the strength of tube connecting portions.
Figure 5B:
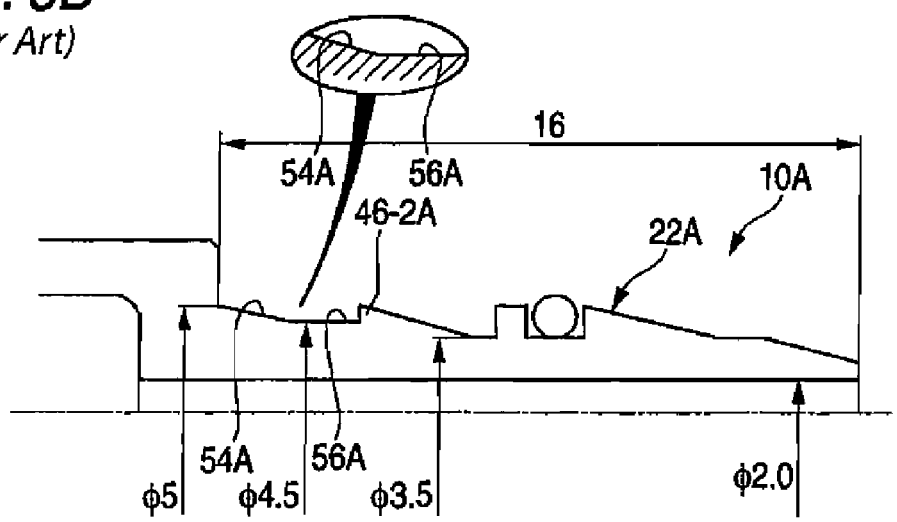

Table 1 below shows the strength of the tube connecting portion 22 in the quick connector 10 of this embodiment shown in FIG. 5A in comparison with the strength of a tube connecting portion 22A in a quick connector 10A in a comparative example shown in FIG. 5B.

TABLE 1

|  | Sample 1 | Sample 2 |
|---|---|---|
| Embodiment | 199 | 200 |
| Comparative Example | 49 | 61 |

(Unit: N)

Incidentally, in the tube connecting portion 22 of the quick connector 10 in this embodiment, the dimension L (length) was set to 16 mm, the dimension d0 to 2 mm, the dimension d1 to 3.5 mm, the dimension d2 to 4.5 mm, and the dimension d3 to 5 mm (as for d0 to d3 and L, see FIG. 4). The inner diameter D of the tube 12 was set to 2.5 mm (as for D, see FIG. 1). Thus, L/D (the length divided by the inner diameter of the tube 12) was 6.4.

Meanwhile, in the comparative example, the dimension corresponding to d1 was set to 3.5 mm, and the dimension corresponding to d3 was set to 5 mm.

Incidentally, in the quick connector 10A of the comparative example, a flat surface 56A is provided between a tapered surface 54A and an annular projection 46-2A. The outside diameter of this flat surface 56A was set to 4.5 mm.

Figure 6:
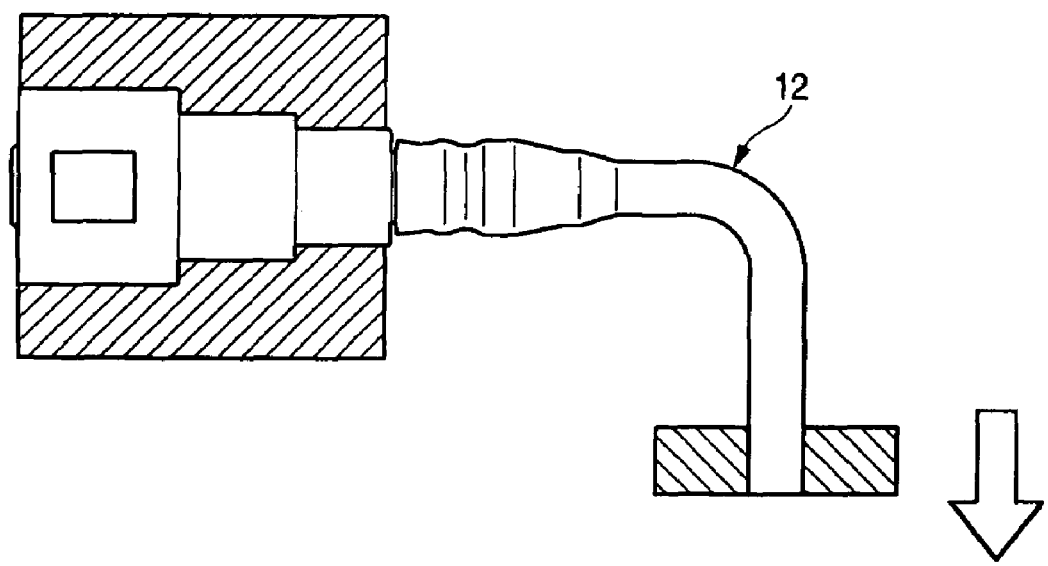
FIG. 6 is a diagram explaining a method of a strength measurement test.

FIG. 6 shows a method of conducting a strength measurement test.

In this strength measurement test, the resin-made tube 12 was connected to the tube connecting portions 22 and 22A (shown in FIGS. 5A and 5B) by press fitting at room temperature (23° C.). Then, the load was measured while pulling the tube 12 downward at a fixed velocity (100 mm/mm) until the root portion of each of the tube connecting portions 22 and 22A was broken, thereby measuring the strength.

In this measurement test, as shown in Table 1, the tube connecting portion 22 in the quick connector 10 of this embodiment exhibited high strength.

Figure 7:
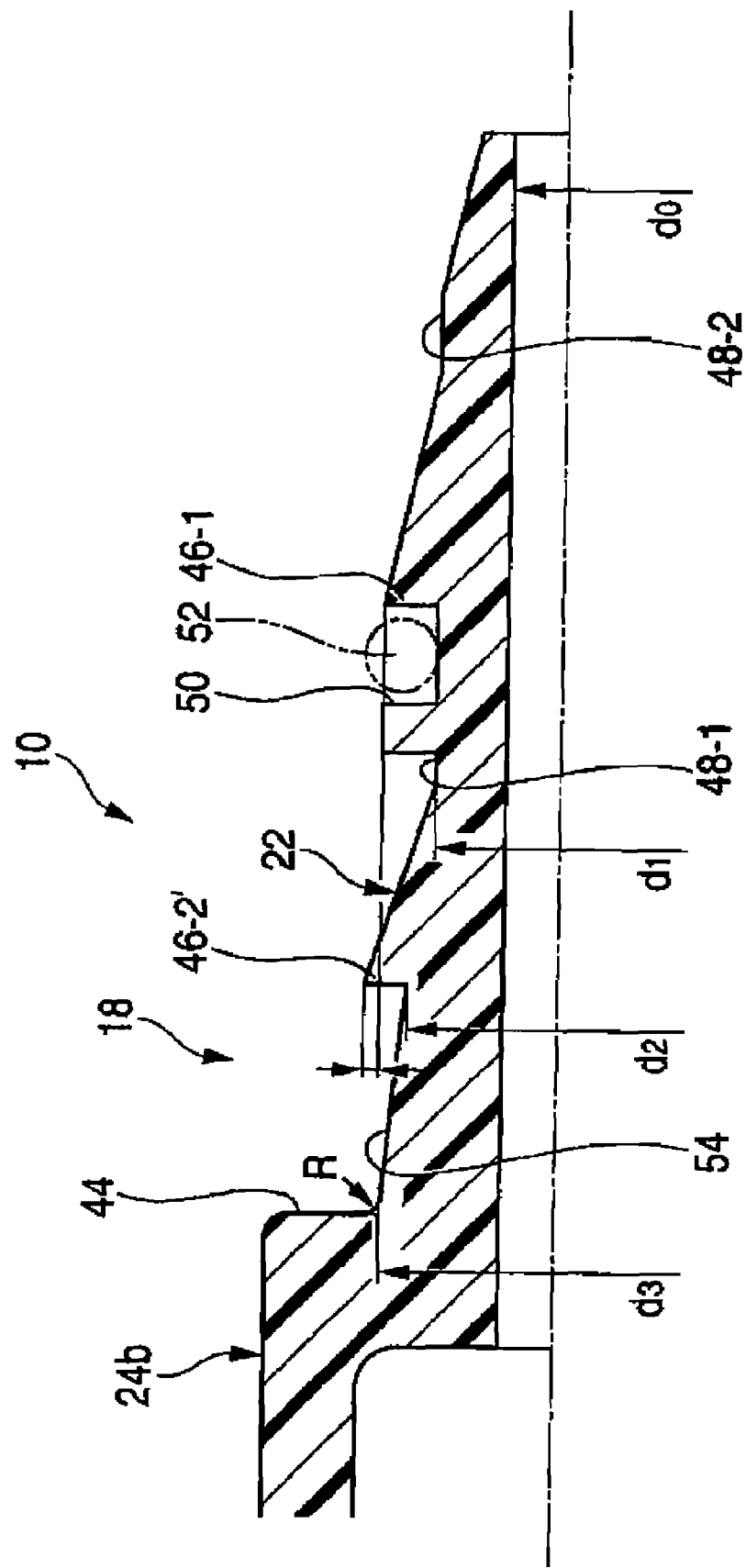
FIG. 7 is an enlarged cross-sectional view of essential portions of another embodiment of the invention.
Figure 8:
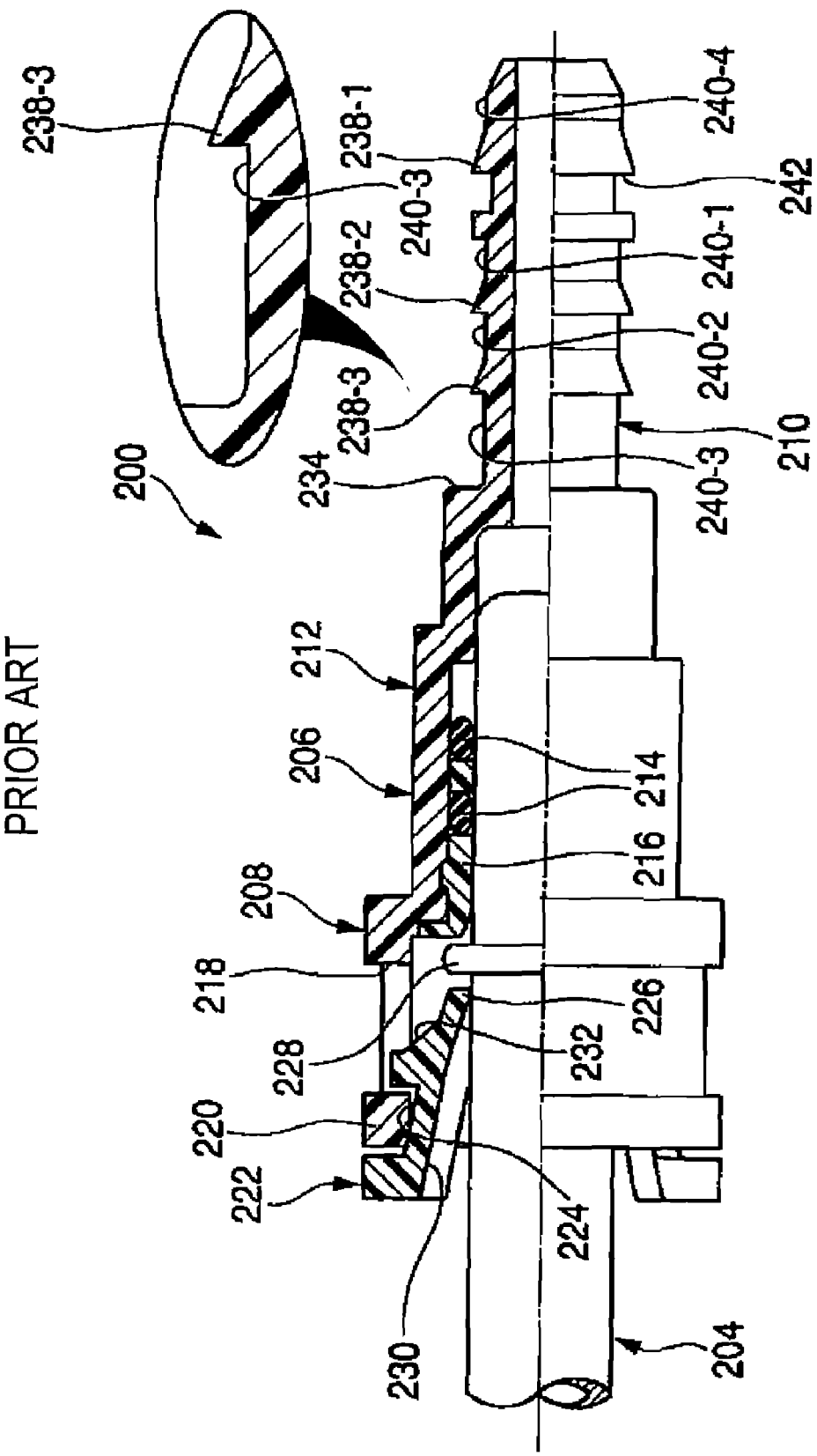
FIG. 8 is a diagram illustrating an example of a quick connector in the related art.
Figure 9A:
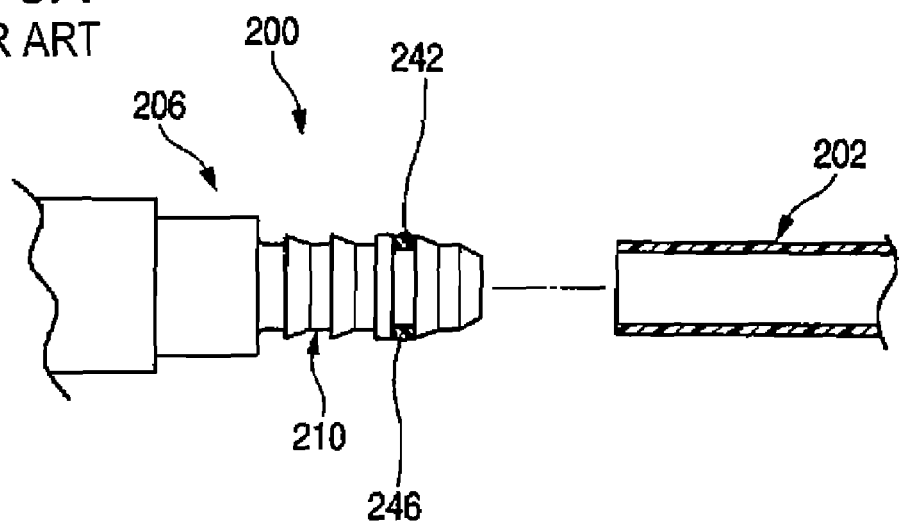
FIGS. 9A and 9B are explanatory diagrams illustrating a part of the procedure of tube connection by the quick connector shown in FIG. 8.
Figure 9B:
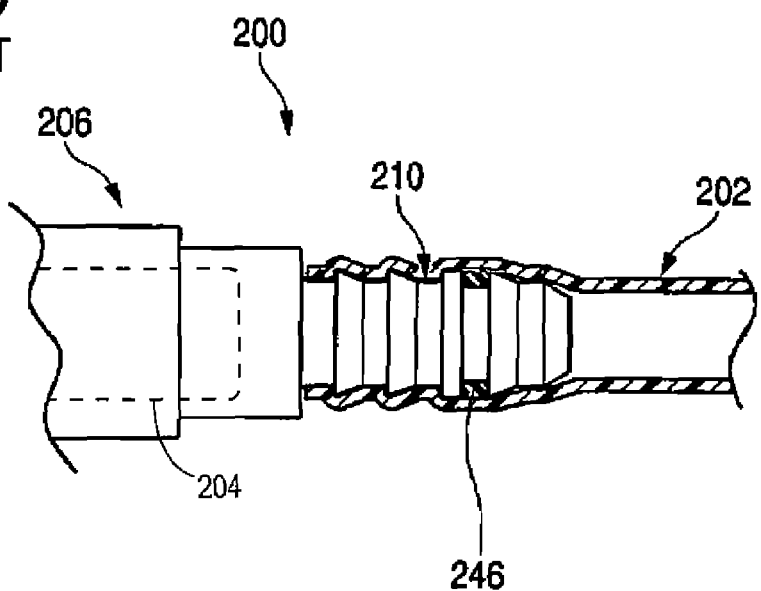

FIG. 7 shows another embodiment of the invention, and in this embodiment the diameter of the annular projection 46-2 is made larger than the diameter of the other annular projection 46-1.

Namely, this is an example in which the projection height of the farthest annular projection 46-2 on the side close to the jointing point in the tube connecting portion 22 is made higher than the projection height of the annular projection 46-1 located more on the distal end side.

Incidentally, in the embodiment shown in FIG. 7, the joint of the tube connecting portion 22 is provided with a slight round shape (circular arc shape) R. The provision of such a slight round shape makes it possible to further improve the strength of the tube connecting portion 22 of the quick connector 10. Preferably, the curvature radius of the round shape R is set to be 0.2 mm-1.5 mm, and more preferably, 0.5 mm-1.2 mm.

According to the embodiment shown in this FIG. 7, since the diameter of the farthest annular projection 46-2 is made larger than the diameter of the annular projection 46-1 on the distal end side, even in the case where the diameter of the root portion extending from the farthest annular projection 46-2 to the jointing point of the tube connecting portion 22 is made large, it is possible to maintain the amount of the biting of the farthest annular projection 46-2 into the inner surface of the tube 12 at a high level and maintain the effect of preventing the coming off of the tube 12 as a result of it to a high level.

Although a detailed description has been given of the embodiments of the invention, these embodiments are only illustrative, and various modifications and variations to the invention may be practiced within the scope that does not depart from the gist of the invention.

What is claimed is:

1. A quick connector for connecting a flexible tube to a mating pipe, comprising:
   a connector body which is formed in a tubular shape as a whole, the connector body having on its one axial side a retainer holding portion for insertion of the mating pipe therein, on its other axial side a tube connecting portion to be press fitted into the tube, and a housing between the retainer holding portion and the tube connecting portion, the tube connecting portion being formed with a plurality of annular projections having surfaces whose diameters linearly increase towards the housing at one or more rates and that serve as detents for the tube by biting into an inner surface of the tube, the annular projections being formed in such a way as to be axially spaced apart from each other;
   a retainer which is held in an axially fixed state by the retainer holding portion and serves as a detent for the mating pipe by axially engaging an engaging portion on an inner peripheral side thereof with an engageable portion of an outer peripheral surface of the mating pipe; and
   a seal member which is fitted in the connector body and located in a seal holding portion of the housing, and serves as a seal by coming into contact with an outer peripheral surface of the inserted mating pipe;
   wherein a portion of an outer surface of the tube connecting portion extending from the annular projection, which is closest to the housing, all the way to the housing is formed into a tapered surface whose diameter continuously, gradually and linearly enlarges toward the housing at a rate less than the one or more rates of any of the surfaces of the plurality of annular projections, and a diameter of an annular projection side of the tapered surface is set to be larger than a diameter of the outer surface of the tube connecting portion between the annular projections.

2. The quick connector according to claim 1, wherein a flat surface which is parallel to an axial direction is provided between the annular projections in the tube connecting portion, and the diameter of the annular projection side of the tapered surface is set to be larger than a diameter of the flat surface.

3. The quick connector according to claim 1, wherein a wall for causing a distal end face of the tube to abut against the wall rises radially outwardly from a jointing point between the tube connecting portion and the housing.

4. The quick connector according to claim 3, wherein a maximum diameter of the tapered surface on a side of the jointing point and each annular projection is set to be substantially the same.

5. The quick connector according to claim 1, wherein a diameter of the annular projection that is closest to the housing is set to be larger than a diameter of any other annular projection.

6. The quick connector according to claim 3, wherein the wall rises substantially orthogonally from the jointing point.

7. The quick connector according to claim 1 wherein a seal member is located on the tube connecting portion side away from the retainer holding portion, and serves as a seal by coming into contact with an inner peripheral surface of the flexible tube.

8. The quick connector according to claim 1 wherein the length of the entire tube connecting portion divided by the outer diameter of the tube connecting portion from a jointing point between the tube connecting portion and the housing to an annular projection furthest along the tube connecting portion at any individual point is within the range of approximately 3.2 to 4.5.

* * * * *